Jan. 2, 1951  R. E. COE  2,536,678
FUEL MIXING APPARATUS
Filed May 26, 1945  2 Sheets-Sheet 2

Inventor
Richard E. Coe
By Frease and Bishop
Attorneys

Jan. 2, 1951  R. E. COE  2,536,678
FUEL MIXING APPARATUS
Filed May 26, 1945  2 Sheets-Sheet 1

Inventor
*Richard E. Coe*
By *Frease and Bishop*
Attorneys

Patented Jan. 2, 1951

2,536,678

UNITED STATES PATENT OFFICE 2,536,678

FUEL MIXING APPARATUS

Richard E. Coe, Salem, Ohio, assignor to The Electric Furnace Company, Salem, Ohio, a corporation of Ohio Application May 26, 1945, Serial No. 595,937

7 Claims. (Cl. 137—165)

The invention relates to mixing air and gas to form a fuel or gaseous mixture, and more particularly to a mixing apparatus for mixing gases downstream of a blower and for maintaining a constant or controlled ratio or relationship of the gases, such as air and gas, throughout an extremely wide flow range. Furthermore, the present invention constitutes improvements upon the Fuel Mixing Apparatus of Cope Patent No. 2,341,177.

The fuel mixing apparatus of said Cope Patent No. 2,341,177 is satisfactory for maintaining a constant or controlled air-gas ratio over a wide range of flow; but it is an upstream mixer—that is, air and gas are mixed ahead of the blower—and is subject to the disadvantage of all upstream mixers, in that the blower must handle a combustible mixture which involves an explosion hazard and is dangerous.

Prior downstream air-gas mixers use an orifice in the air line, another orifice in the gas line, and a valve in series with one or the other orifice; the valve being automatically controlled so as to attempt to maintain constantly related pressure differentials across the two orifices. However, serious difficulties arise in such prior constructions because the pressure differential across an orifice varies as the square of the flow. With wide ranges of flow, there is an excessively high pressure or differential at one end of the range and an excessively low pressure or differential at the other end of the range. Furthermore, in such constructions, there is a transition from turbulent to laminar or streamline flow at low pressure differentials, accompanied by variation in orifice coefficients sufficient to introduce serious errors.

Moreover, in prior art fuel mixers, it is necessary to govern the gas pressure with a high degree of accuracy at low rates of flow; and available pressure governors cannot regulate gas pressures under such conditions with the required degree of precision.

These difficulties have prevented prior downstream fuel mixers from maintaining a definite air-gas ratio throughout a wide flow range with the desired degree of accuracy.

In the upstream mixer of the Cope Patent No. 2,341,177, variations in the pressure in the conduit for the mixed gases upstream of the blower are used for maintaining a substantially constant pressure drop across the orifices. However, this expedient cannot be used in a downstream fuel mixer because blower pressure is operating upon the gases in the mixed gas conduit; and pressure variations in the mixed gas conduit do not bear the proper relation to volume of flow to permit the control of orifices by this means.

In spite of the foregoing difficulties, there is a demand for downstream fuel mixing apparatus—in which the explosion hazard is absent—which will maintain a constant selected air-gas ratio in a fuel mixture supplied to burners of various types of furnaces, irrespective of the rate of flow of the air-gas mixture to or through the burners, or in other words, irrespective of the burner fuel demand; particularly in connection with controlled atmosphere furnaces where large variations in demand are encountered.

I have discovered that the foregoing difficulties may be overcome and the problem solved in downstream fuel mixer construction that maintains a constant or controlled air-gas ratio over wide flow ranges, by providing for varying the relative rates of opening or closing of two valves—constituting variable orifices—one in the gas line and another in the air line downstream of the blower; by governing the gas pressure in the gas line with relation to the pressure existing in the air line, upstream of their respective orifices; by maintaining the same or a constantly related pressure drop across both orifices; and by simultaneously controlling the valves to accommodate increased or decreased flow in response to a change in pressure drop across one of the orifices.

It is a primary object of the present invention to provide new downstream fuel mixing apparatus which avoids the dangers and hazards of upstream fuel mixers.

Furthermore, it is an object of the present invention to provide downstream fuel mixing apparatus which maintains a definite, constant or controlled air-gas ratio throughout a wide flow range with the desired or necessary degree of accuracy.

Likewise, it is an object of the present invention to provide downstream fuel mixing apparatus which avoids prior art difficulties arising from variations in pressure differentials across orifices incident to variations in flow.

Also, it is an object of the present invention to provide new downstream fuel mixing apparatus in which the gas pressure may be governed in relation to the air pressure with the required degree of precision in a simple manner.

Moreover, it is an object of the present invention to provide fuel mixing apparatus in which a predetermined constant pressure drop is maintained across the air and gas orifices irrespective of changes in the size of said orifices or in the rate of flow therethrough.

Furthermore, it is an object of the present invention to automatically and simultaneously vary the size of two orifices in fuel mixing apparatus to maintain the desired differential pressure across one of the orifices in response to a change in pressure drop across said orifice in order to accommodate increased or decreased flow.

Moreover, it is an object of the present invention to provide downstream fuel mixing apparatus for mixing air and gas in which the air-gas ratio may be maintained within approximately 3% of a selected value such as 10.5 to 1, 10.0 to 1, 9.5 to 1, and 9.0 to 1 throughout a flow range of say 20 or more to 1.

Furthermore, it is an object of the present invention to provide downstream fuel mixing apparatus having variable sized orifices in which adjustments may be made to compensate for variations in the flow coefficient of any orifice incident to a change in size thereof, or a change in rate of flow therethrough.

Furthermore, it is an object of the present invention to provide downstream fuel mixing apparatus having a plurality of orifices adjustable as to size, which may be opened or closed simultaneously, with means for varying the rate of change of opening of one with respect to another.

Finally, it is an object of the present invention to provide new downstream fuel mixing apparatus which is simple in construction; durable, precise, effective and accurate in operation; and which overcomes the foregoing prior art difficulties and solves problems existing in the art.

These and other objects and advantages apparent to those skilled in the art from the following description and claims may be obtained, the stated results achieved, and the described difficulties overcome, by the devices, constructions, arrangements, combinations, sub-combinations, parts, elements, discoveries and principles which comprise the present invention, the nature of which is set forth in the following general statement, a preferred embodiment of which—illustrative of the best mode in which applicant has contemplated applying the principle—is set forth in the following description and shown in the drawings and which are particularly and distinctly pointed out and set forth in the appended claims forming part hereof.

The nature of the improvements in downstream fuel mixing apparatus of the present invention may be stated in general terms as preferably including a valve for one fluid such as air, a second valve for another fluid such as gas, said valves constituting variable orifices, means for varying the relative rates of opening or closing of the two valves, a blower upstream of said air valve, means for governing the gas pressure in the gas line with relation to the pressure existing in the air line upstream of said valves, means for maintaining the same pressure drop across both orifices by leading the fluid passing therethrough to a common mixing point, and means for operating both valves simultaneously to open or close the same to accommodate increased or decreased flow actuated by a change in pressure drop across the orifice of one of said valves.

By way of example, a preferred embodiment of the improved fuel mixing apparatus is illustrated in the accompanying drawings forming part hereof wherein.

Similar numerals refer to similar parts throughout the various figures of the drawings.

Figure 1:
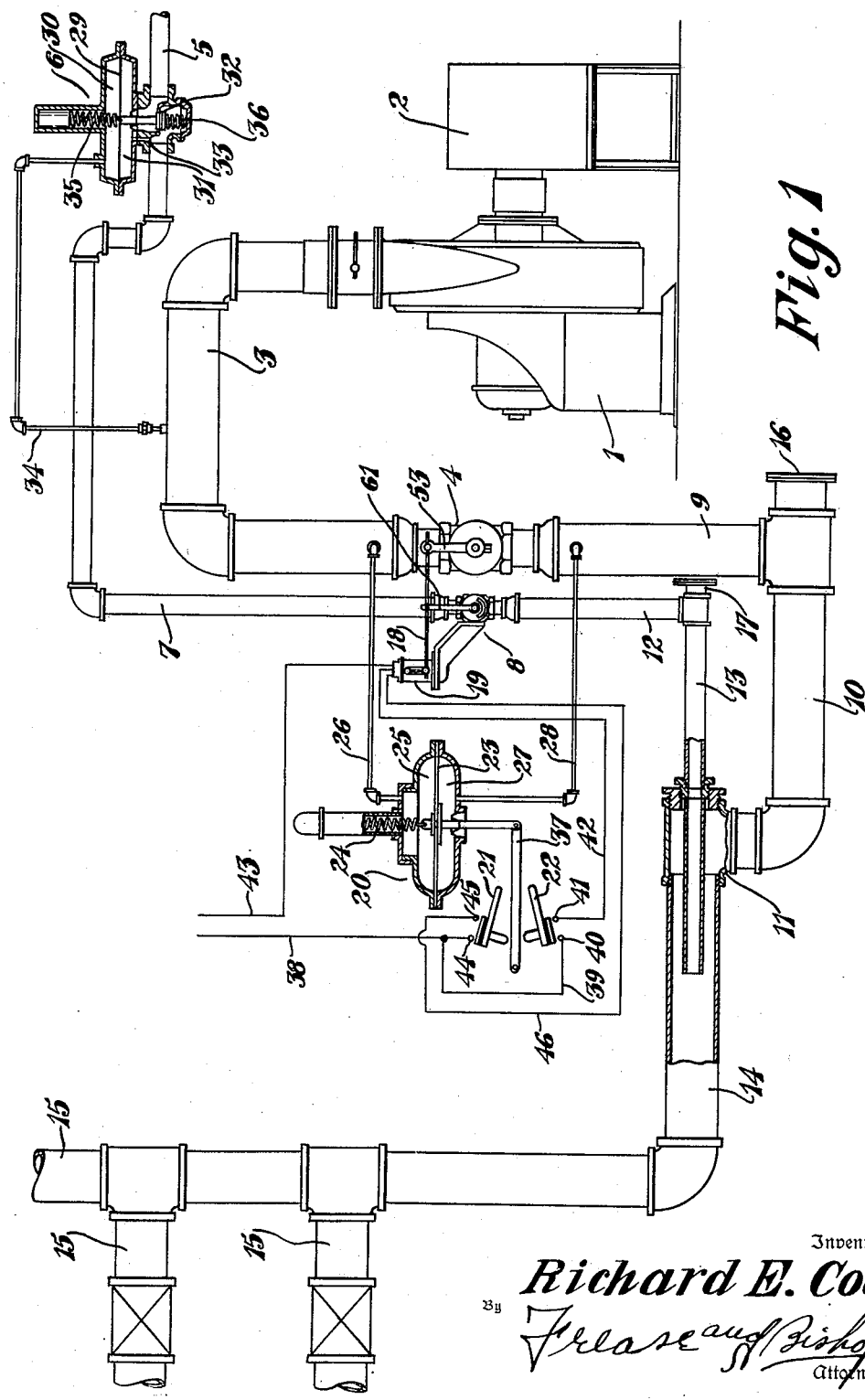
Figure 1 is a diagrammatic view of the improved fuel mixing apparatus.

The improved downstream fuel mixing apparatus and its arrangement in a control system adapted for supplying a constant or controlled ratio air-gas mixture to one or more burners of a gas-fired furnace is illustrated somewhat diagrammatically in Figure 1.

The apparatus includes a blower 1 having an air filter 2 for supplying air under pressure to the air conduit 3 leading to the air valve generally indicated at 4. Gas under pressure is supplied to supply conduit 5 and passes through a regulator 6 and through conduit 7 to a gas valve generally indicated at 8. Pipes 9 and 10 lead to mixing T 11 from air valve 4, and pipes 12 and 13 lead from gas valve 8 to mixing T 11. A conduit 14 leads from mixing T 11 to burner supply pipes 15. An explosion relief head 16 may be provided between air pipes 9 and 10; and a similar explosion relief head 17 may be provided between gas pipes 12 and 13.

The air and gas valves 4 and 8 are hereinafter described more in detail. Referring to Fig. 1, they are both simultaneously operated by a rod 18 extending from valve actuating motor 19. The operation of motor 19 is controlled by diaphragm controller generally indicated at 20 and by switches 21 and 22. The diaphragm 23 of controller 20 is spring loaded at 24, and one side 25 of the diaphragm chamber communicates through pipe 26 with the air conduit 3 immediately upstream of the air valve 4, while the other side 27 of the diaphragm chamber communicates through pipe 28 with the air pipe 9 immediately downstream of the valve 4 and upstream of the mixing T 11.

Gas pressure regulator 6 includes a diaphragm 29, an upper diaphragm chamber 30, a lower diaphragm chamber 31 and a valve 32 actuated by the diaphragm 29. The lower diaphragm chamber 31 communicates through connection 33 with the outlet side of valve 32, that is, with pipe 7. The upper diaphragm chamber 30 communicates through pipe 34 with air conduit 3. Diaphragm 29 is spring loaded at 35 and valve 32 may be spring loaded at 36.

Proper operation of the downstream fuel mixing apparatus of the present invention requires that the gas pressure in gas line 7 be maintained or governed to have the same pressure, or a predetermined pressure differing by a constant amount, as the pressure which exists in the air line 3. This condition is maintained by the gas regulator 6 cross-connected to the air line 3 in the manner described.

Thus, the springs 35 and 36 are adjusted so that the regulator 6 maintains the same pressure in gas line 7 (or a pressure differing by a constant pre-selected amount) as the pressure existing in air line 3. Whenever the pressure in gas line 7 falls below the pre-selected value, a reduced pressure occurs in chamber 31 and diaphragm 29 moves downward increasing the opening of valve 32, supplying increased pressure from supply pipe 5 until the desired relationship between the pressures in gas conduit 7 and air conduit 3 is reestablished.

Conversely, if the gas pressure in conduit 7 tends to increase above the desired relation between it and the pressure in air conduit 3, diaphragm 29 moves upward tending to close the valve 32 and reduce the gas pressure from the supply until the desired condition is reestablished.

Thus, gas regulator 6 by its cross-connection with the air line 3 governs the gas pressure in gas line 7 with relation to the pressure existing in the air line 3 at all times.

Proper operation of the present downstream fuel mixing system also requires a constant differential pressure or pressure drop to be maintained at all times across one of the valves 4 and 8, and as shown, this control is maintained across the air valve 4. With the amount of pressure drop determined, spring 24 of diaphragm 23 of controller 20 is loaded so that diaphragm 23 is in central or neutral position for the determined constant pressure differential. When the pressure differential tends to increase, as when the fuel demand at the furnace burners increases, diaphragm 23 moves downward and lever 37 connected therewith moves downward to close normally open micro-switch 22.

An electric circuit is thus established through line 38, line 39, contacts 40 and 41 of switch 22, line 42, valve control motor 19 and line 43. Valve actuating motor 19 operates to move rod 18 in one direction which begins to open valves 4 and 8. The opening of said valves continues until the set value of the pressure drop across air valve 4 is reestablished when diaphragm 23 returns to neutral position and operates lever 37 to open switch 22, thus stopping motor 19 and stopping further opening of valves 4 and 8.

Conversely, when the fuel demand at the furnace burners decreases, the pressure drop or differential across valve 4 tends to decrease, thus moving diaphragm 23 upward so that lever 37 closes micro-switch 21.

When this occurs, an electric circuit is established through line 38, contacts 44 and 45 of switch 21, line 46, valve control motor 19 and line 43. Valve actuating motor 19 operates in the other direction to close valves 4 and 8 until the set value of the pressure drop across valve 4 is reestablished when diaphragm 23 returns to neutral position, opening switch 21 and stopping valve motor 19, thus stopping further closing of valves 4 and 8.

Since the pressure in gas line 7 ahead of valve 8 is controlled by regulator 6 with relation to the pressure in air line 3 ahead of air valve 4 and since both valves 8 and 4 discharge into the common conduit 14 wherein the pressure is maintained by the blower 1, the pressure drop across gas valve 8 is maintained constant, and in a fixed relation to the pressure drop across air valve 4, by the control of the pressure drop across air valve 4 and by the simultaneous opening or closing of valves 4 and 8 to accommodate changes in flow.

Figure 4:
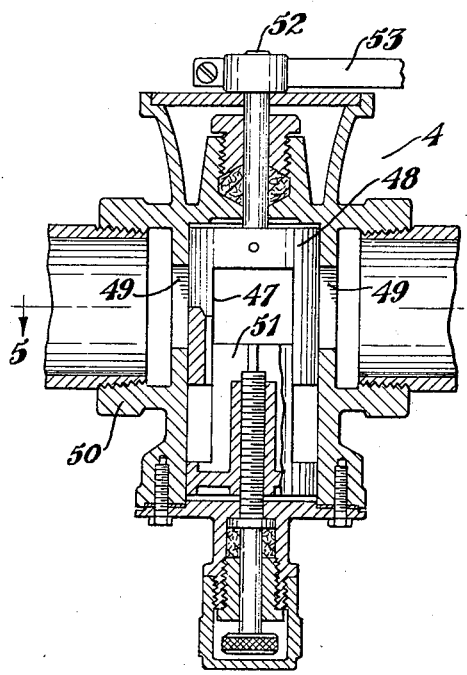
Fig. 4 is a longitudinal section of the other valve.
Figure 5:
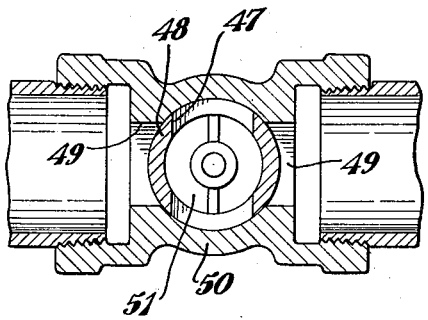
Fig. 5 is a section taken on the line 5—5, Fig. 4.

Referring to Figs. 4 and 5, air valve 4 may be a usual form of adjustable port valve in which a rectangular port 47 is provided in movable valve member 48, which opens or closes across rectangular ports 49 in a stationary valve member or casing 50. The rectangular port or orifice 47 may be adjustable as to size by movement of member 51 in the usual manner, and movable member 48 may be rotated through trunnion 52 to which lever 53 is attached. Lever 53 in turn is connected with rod 18 of motor 19. Thus, movement of rod 18 in one direction tends to close valve 4, and movement of rod 18 in the other direction tends to open valve 4.

Because of the fact that the flow coefficients of varying sized orifices change and because the orifices of valves 4 and 8 have different sizes, and for other reasons, the theoretical relation established and maintained by the control of the conditions described above cannot always actually produce results in exact accordance with the theoretical relationship without providing for certain adjustments in either one or both of valves 4 and 8.

Figure 2:
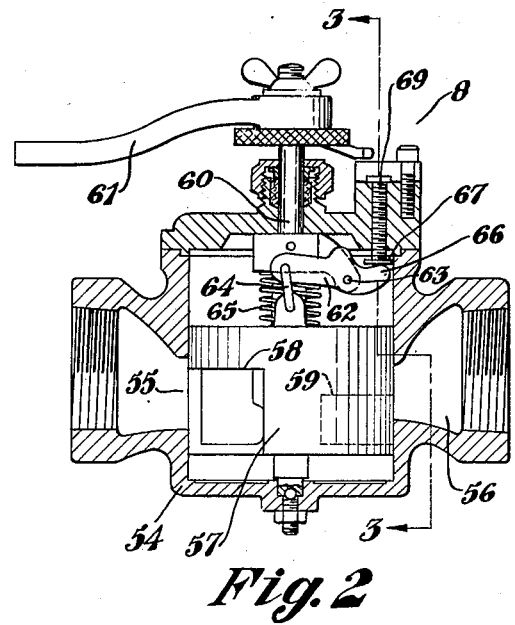
Fig. 2 is a longitudinal section through one of the valves of the improved apparatus.
Figure 3:
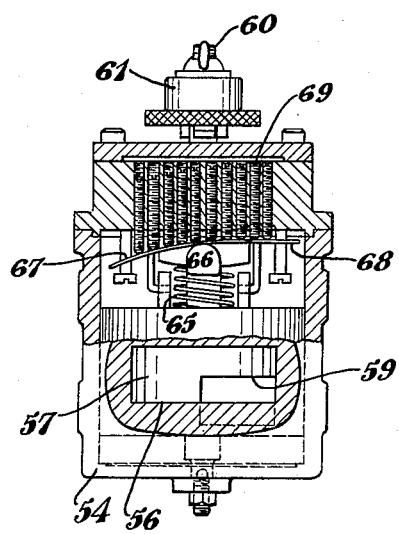
Fig. 3 is a section looking in the direction of the arrows 3—3, Fig. 2.

In the present fuel mixing apparatus, the additional adjustments are taken care of in the gas valve 8 (Figs. 2 and 3) which may include a housing 54 having rectangular ports 55 and 56 therein in which movable valve member 57 is rotatably mounted. Valve member 57 is provided with a rectangular port 58 and another rectangular port 59 which open or close across rectangular ports 55 and 56, respectively. Member 57 is rotated for opening or closing the valve by rotation of valve stem 60 to which lever 61 is attached. Lever 61 is in turn connected to rod 18 of valve operating motor 19. Movement of rod 18 in one direction tends to close valve 8 and movement of rod 18 in the other direction tends to open valve 8.

The effective orifice of valve 8, in addition to opening and closing by rotation of valve stem 60, may also be adjusted to enlarge or reduce the size thereof at any position of its movement. This is accomplished by pivoting lever 62 at 63 on valve stem 60 and linking its inner end at 64 to valve member 57. A spring 65 normally urges member 57 downward. The outer end 66 of lever 62 engages the under surface of adjustable cam 67 preferably formed by a curved spring steel strip 68 backed up by adjusting screws 69.

Thus, adjustable cam surfaces 67 may be formed by adjustment of screws 69 to raise or lower member 57 at any desired position of rotation of member 57 to provide for changing the rate of opening or closing of the effective orifice provided by valve 8, (in accordance with the results of tests on the system) in order to compensate for changes in the flow co-efficient of the orifice for various sizes thereof, or for changes in the flow therethrough, or for other unbalances in the system.

In the drawings, valve 4 is indicated as an air valve, and valve 8 is indicated as a gas valve, but by minor changes in sizes and arrangements of said valves, valve 4 could be the gas valve and valve 8 could be the air valve. Moreover, these valves have been described as being air and gas valves, but the system may be used for mixing other gases than air and fuel gas.

Likewise, the cam adjustment for varying the rate of change of the effective size of one of the orifices is indicated as being in the gas valve but this cam adjustment may be provided in the air valve, if desired. However, if the cam adjustment is provided in the air valve, the connection of control pipes 26 and 28 for controller 20 should be across the orifice of the gas valve. In other words, the control for maintaining a constant pressure drop across one of the orifices should preferably be connected across the valve which is not cam operated.

When the equipment illustrated diagrammatically in Fig. 1 is installed for any furnace and the air-gas ratio to be maintained at a predetermined or constant rate over a large burner turn-down range is established, the valve settings of valve 8 are temporarily made and the equipment tested to determine fluctuations in the air-gas ratio. From the results of such tests, set screws 69 are adjusted to compensate for unpredictable changes in the flow coefficients and for any other unbalances in the particular installation.

If at any time a different air-gas ratio is desired to be maintained, it may be obtained by adjusting the size of adjustable port 47 of valve 4 by movement of member 51, and by then balancing the system by adjustment of valve 8 if necessary.

Alternatively and preferably, the overall air-gas ratio may be adjusted by adjusting the spring loading of pressure regulator 6. When this method is used, settings may be determined by trial for various ratio requirements, and a previous setting readily duplicated at any time.

The improved fuel mixing apparatus of the present invention has been successfully used to satisfactorily maintain and supply a constant desired air-gas ratio within about 3% of a selected value over a 20 or more to 1 burner turn-down range. Normally, if the cam of valve 8 is adjusted to obtain a predetermined ratio such as a 10.5 to 1 air-gas ratio, the over-all ratio may be changed, by adjusting the curtain of valve 4, or by adjusting the spring loading of pressure regulator 6, to some other air-gas ratio such as 10.0, 9.5 and 9.0 to 1 without disturbing the cam settings originally made on valve 8. In no case was there an observed deviation from the desired point greater than plus or minus 1.5% and in most cases the deviation was less than 1%.

The cross-connected regulator 6 maintained the desired pressure in the gas line 7 in an exceedingly accurate manner. At high flow, the air pressure may exceed the gas pressure by an amount equal to approximately .1" mercury column; but this deviation is not sufficient to affect the maintenance of the desired air-gas ratio.

In comparison to other methods of downstream mixing, the present system has a decided advantage of not depending upon orifice performance to provide impulses for the ratio controlling valve. Plain orifices are unreliable over wide ranges of flow because the critical point in flow characteristic does not occur at the same time in both gas and air orifices, with the result that impulses are imparted to the ratio controller which are not in accordance with the actual flow ratio.

The variable area orifices provided by the valves 4 and 8 eliminate this difficulty because the pressure differential across the valves are maintained practically constant regardless of the rate of flow.

A further advantage of the system illustrated and described herein is the simplicity of the controller 20 which only uses a single diaphragm unit with a simple linkage connection with switches 21 and 22. A controller of this type is not required to be operative to control to exceedingly accurate limits because tests have shown that a 1" H₂O deviation from the set point of constant pressure differential across the valve controlled has no measurable effect upon the maintenance of the desired air-gas ratio. On the other hand, double diaphragm controllers required in prior art arrangements actuated from fixed orifices in gas and air lines require an extremely close control.

Accordingly, the present invention provides a downstream fuel mixer which avoids explosion hazards; which uses adjustable port gas and air valves as variable area orifices operating at a predetermined constant pressure differential across the valves; which adjusts the valve positions automatically to maintain the desired differential pressure across one of the valves by differential pressure control and switch means receiving impulses from both sides of the valve and energizing a motor drive for the valves; which governs the gas pressure in the gas line with relation to the pressure existing in the air line; which delivers a desired or predetermined air-gas ratio reliably over a wide range of flow; and which may be adjusted to change the predetermined air-gas ratio to be maintained.

Accordingly, the fuel mixing apparatus of the present invention eliminates prior art difficulties, solves complicated problems which have existed in the art, and provides for accomplishing each of the foregoing objects in a simple and reliable arrangement.

In the foregoing description, certain terms have been used for brevity, clearness and understanding; but no unnecessary limitations are to be implied therefrom beyond the requirements of the prior art, because such words are utilized for descriptive purposes herein and not for the purpose of limitation and are intended to be broadly construed.

Moreover, the embodiment of the improved construction illustrated and described is by way of example, and the scope of the present invention is not limited to the exact details of construction of the various parts.

Having now described the features of the invention, the construction, operation and use of a preferred embodiment of improved fuel mixing apparatus, and the advantageous, new and useful results obtained thereby; the new and useful devices, constructions, arrangements, combinations, sub-combinations, parts and elements, and reasonable mechanical equivalents thereof obvious to those skilled in the art, are set forth in the appended claims.

I claim:

1. In downstream fuel mixing apparatus, a plurality of valves discharging into a common conduit, each valve having an orifice, means for operating said valves to simultaneously enlarge or reduce the orifice openings thereof, a blower connected with one of the valves upstream thereof, means for supplying gaseous fluid under pressure to the other valve upstream thereof, means for maintaining constantly related pressures in the sources of supply to said valves, means automatically actuated in response to a change in differential pressure across one orifice for controlling said valve operating means to maintain a predetermined differential pressure across one orifice, and means for varying the relative rates of opening or closing of said valve means throughout their ranges of actuation so as to compensate for changes in characteristics of the valve orifices and thereby maintain a constant ratio of the fluid flowing through the valves and into the common conduit.

2. In downstream fuel mixing apparatus, a plurality of valves discharging into a common conduit, each valve having an orifice, means for operating said valves to simultaneously enlarge or reduce the orifice openings thereof, a blower connected with one of the valves upstream thereof supplying gaseous fluid under pressure thereto, means automatically actuated in response to a change in differential pressure across one orifice for controlling said valve operating means to maintain a predetermined differential pressure across one orifice, means for supplying gaseous fluid under pressure to the other valve, means for governing the pressure of the gaseous fluid supplied to said other valve with relation to the pressure of the gaseous fluid supplied by the blower to said one valve, and means for varying the relative rates of opening or closing of said valve means throughout their ranges of actuation so as to compensate for changes in characteristics of the valve orifices and thereby maintain a constant ratio of the fluid flowing through the valves and into the common conduit.

3. In downstream fuel mixing apparatus for mixing air and gas to maintain a controlled air-gas ratio over a wide flow range, air and gas valves providing variable area orifices to accommodate changes in flow, blower means supplying air under pressure to said air valve, means supplying gas under pressure to said gas valve, means governing the gas pressure of the gas supply with relation to the pressure of the air supply upstream of the respective valves, means automatically actuated in response to a change in differential pressure across the orifice of one valve for simultaneously opening or closing said valves to maintain a predetermined differential pressure across the orifice of said one valve, and means for varying the rate at which the other valve opens or closes at places in its range of actuation with respect to the rate at which said one valve opens or closes to control a condition of predetermined air-gas ratio throughout the range of flow.

4. In downstream fuel mixing apparatus for mixing air and gas to maintain a controlled air-gas ratio over a wide flow range, air and gas valves providing variable area orifices to accommodate changes in flow, blower means supplying air under pressure to said air valve, means supplying gas under pressure to said gas valve, means governing the gas pressure of the gas supply with relation to the pressure of the air supply upstream of the respective valves, means automatically actuated in response to a change in differential pressure across the orifice of one valve for simultaneously opening or closing said valves to maintain a predetermined differential pressure across the orifice of said one valve, means for varying the relative rates of opening or closing of said valves throughout their ranges of actuation so as to compensate for changes in characteristics of the valve orifices and thereby maintain a constant ratio of the fluid flowing through the valves and into the common conduit, and means for adjusting the area of one of the orifices to change the air-gas ratio of the delivered mixture.

5. In downstream fuel mixing apparatus for mixing air and gas to maintain a controlled air-gas ratio over a wide flow range, air and gas valves providing variable area orifices to accommodate changes in flow, blower means supplying air under pressure to said air valve, means supplying gas under pressure to said gas valve, means governing the gas pressure of the gas supply with relation to the pressure of the air supply upstream of the respective valves, means automatically actuated in response to a change in differential pressure across the orifice of one valve for simultaneously opening or closing said valves to maintain a predetermined differential pressure across the orifice of said one valve, means for varying the rate at which the other valve opens or closes at places in its range of actuation with respect to the rate at which said one valve opens or closes to control a condition of predetermined air-gas ratio throughout the range of flow, and means for adjusting the area of the orifice of said one valve to change the air-gas ratio of the delivered mixture.

6. In downstream fuel mixing apparatus for mixing air and gas to maintain a controlled air-gas ratio over a wide flow range, air and gas valves providing variable area orifices to accommodate changes in flow, blower means supplying air under pressure to said air valve, means supplying gas under pressure to said gas valve, means governing the gas pressure of the gas supply with relation to the pressure of the air supply upstream of the respective valves, means automatically actuated in response to a change in differential pressure across the orifice of the air valve for simultaneously opening or closing said valves to maintain a predetermined differential pressure across the orifice of the air valve, and means for varying the rate at which the gas valve opens or closes at places in its range of actuation with respect to the rate at which the air valve opens or closes to control a condition of predetermined air-gas ratio throughout the range of flow.

7. In downstream fuel mixing apparatus for mixing air and gas to maintain a controlled air-gas ratio over a wide flow range, air and gas valves providing variable area orifices to accommodate changes in flow, blower means supplying air under pressure to said air valve, means supplying gas under pressure to said gas valve, means governing the pressures of the gas and air supplies with relation to each other upstream of the respective valves, means automatically actuated in response to a change in differential pressure across the orifice of one valve for simultaneously opening or closing said valves to maintain a predetermined differential pressure across the orifice of said one valve, and means for varying the rate at which one of the valves opens or closes at places in its range of actuation with respect to the rate at which the other valve opens or closes to control a condition of predetermined air-gas ratio throughout the range of flow.

RICHARD E. COE.

REFERENCES CITED

The following references are of record in the file of this patent:

UNITED STATES PATENTS

| Number | Name | Date |
|---|---|---|
| 2,193,240 | Schmidt | Mar. 12, 1940 |
| 2,341,177 | Cope | Feb. 8, 1944 |
| 2,379,633 | Garretson | July 3, 1945 |